United States Patent [19]
Reinicke

[11] Patent Number: 5,333,833
[45] Date of Patent: Aug. 2, 1994

[54] ROTARY BALL VALVE WITH LIFTING BALL

[75] Inventor: Robert H. Reinicke, Mission Viejo, Calif.

[73] Assignee: Marotta Scientific Controls, Inc., Montville, N.J.

[21] Appl. No.: 89,116

[22] Filed: Jul. 8, 1993

Related U.S. Application Data

[63] Continuation-in-part of Ser. No. 868,023, Apr. 13, 1992, Pat. No. 5,228,645.

[51] Int. Cl.$^5$ .......................... F16K 3/22; F16K 31/04
[52] U.S. Cl. ........................................ 251/77; 251/56; 251/129.04; 251/129.11; 251/129.13; 251/160
[58] Field of Search ...................... 251/56, 77, 129.04, 251/129.11, 129.12, 129.13, 160

[56] References Cited

U.S. PATENT DOCUMENTS

| | | | |
|---|---|---|---|
| 4,013,264 | 3/1977 | Friedell | 251/129.11 X |
| 4,288,060 | 9/1981 | Mittell | 251/56 X |
| 4,296,913 | 10/1981 | Hoyer | 251/77 X |
| 5,083,744 | 1/1992 | Reinicke et al. | 251/129.11 |

Primary Examiner—Gerald A. Michalsky
Attorney, Agent, or Firm—Hopgood, Calimafde, Kalil & Judlowe

[57] ABSTRACT

A ball-valve member, which in its valve-closed condition must have circumferentially continuous sealed contact with its seat, is mounted for rotation about an axis which is eccentrically gyrated in the course of limited rotation of an actuating element that is journalled in the valve body. The eccentric throw is selected to be such in relation to the full course of actuating-element rotation that, beginning with a fully-closed condition of the valve, an initial fraction of the course of actuating-element rotation is devoted to achieving the eccentric throw (without rotating the ball), whereby to displace the ball-rotation axis in the axial direction away from seat engagement; the ball surface is thus displaced into axially offset clearance with respect to the seat, before devoting the remaining fraction of actuating-element rotation to the task of rotating the ball to its valve-open position. In the presently preferred form to be described, a rotary lost-motion connection between eccentric displacement and ball rotation makes it possible for a single direction of controlled driving torque to the actuating element to perform the indicated sequence for a valve-opening direction, and the reverse sequence for a closing direction of valve actuation; in the closing direction, all rotation of the valve-member ball is in axially offset relation to the seat, while eccentric displacement to achieve a seated closure occurs only after the ball has been rotated into axially offset register with its seat.

21 Claims, 8 Drawing Sheets

| SEMICONDUCTOR STATUS (ON OR OFF) | AT | ON | OFF | OFF | OFF | OFF | ON |
|---|---|---|---|---|---|---|---|
| | BT | OFF | ON | ON | OFF | OFF | OFF |
| | CT | OFF | OFF | OFF | ON | ON | OFF |
| | AB | OFF | OFF | ON | ON | OFF | OFF |
| | BB | OFF | OFF | OFF | OFF | ON | ON |
| | CB | ON | ON | OFF | OFF | OFF | OFF |

| MOTOR CURRENT | $I_A$ | +3 AMPS / 0 / -3 AMPS |
|---|---|---|
| | $I_B$ | +3 AMPS / 0 / -3 AMPS |
| | $I_C$ | +3 AMPS / 0 / -3 AMPS |

| MOTOR TORQUE | 16.1 in-lb |
|---|---|
| | 13.9 in-lb |

15.1 in-lb AVERAGE

| ROTOR POSITION, DEGREES | 0 | 10 | 20 | 30 | 40 | 50 | 60 |
|---|---|---|---|---|---|---|---|
| | 60 | 70 | 80 | 90 | 100 | 110 | 120 |
| | 120 | 130 | 140 | 150 | 160 | 170 | 180 |

FIG. 7

ROTARY BALL VALVE WITH LIFTING BALL

RELATED CASE

This application is a continuation-in-part of copending original application, Ser. No. 07/868,023, filed Apr. 13, 1992, now U.S. Pat. No. 5,228,645.

BACKGROUND OF THE INVENTION

The invention relates to so-called ball valves wherein a valve member which rotates to control fluid flow through the valve is characterized by a spherical surface which has sealed engagement to an annular seat for the closed condition of the valve.

The conventional valve member of a ball valve is a full sphere, except for a radial stem and a diametrically extending bore that is transverse to the stem direction. The valve-member or ball is actuable by limited rotation, e.g., 90 degrees, about a valve-body axis of stem support, wherein said axis extends through the center of the sphere, intersecting and normal to the axis of the diametrically extending bore.

In the open condition of the valve, the diametrically extending bore aligns with cylindrical inlet and outlet ports or passages in the valve body, and an annular seal such as an elastomeric O-ring retained by one or both of these ports or passages is in peripherally continuous seated and sealing contact with the ball, encircling the adjacent end of the diametrically extending bore of the valve member. As the valve-member is actuated in the valve-closing direction, the valve-member bore and the inlet/outlet passage become progressively misaligned while the ball rotates with continuing seat engagement, thus reducing the sectional area available for inlet-to-outlet flow. When fully rotated to the valve-closed condition, a smooth spherical surface of the ball is circumferentially sealed to its seat, in total blockage of inlet-to-outlet flow.

The actuating operation of a conventional ball valve is thus characterized by the frictional resistance of the ball-to-seat engagement. For many applications, this friction can be reduced by appropriate choice of seat material and by careful attention to ball sphericity and to the accuracy of ball-stem mounting and rotation. But for other applications, as for controlled flow of cryogenic materials such as liquified oxygen, liquified hydrogen, liquified nitrogen, or other gases whether or not in liquid state, seating materials and engagements become sources of friction, wear, and leakage, to the extent that mechanical hysteresis is an on-going operational factor, and repair and maintenance expenses are relatively great.

BRIEF STATEMENT OF THE INVENTION

It is an object of the invention to provide an improved ball-valve construction of the character indicated.

It is a specific object to meet the above object with a ball-valve construction in which actuating friction and accompanying hysteresis are reduced to relative insignificance.

Another specific object is to meet the above objects with a construction which is inherently suited to avoiding or very substantially reducing the repair and maintenance expense of handling controlled flows of cryogenic liquids and/or gases.

The invention achieves these objects in a ball-valve construction wherein the ball surface, which in valve-closed condition must have circumferentially continuous sealed contact with its seat, is mounted for rotation about an axis which is eccentrically displaced in the course of limited rotation of an actuating element that is journalled in the valve body. The eccentric throw is selected to be such in relation to the full course of actuating-element rotation that, beginning with a full-closed condition of the valve, an initial fraction of the course of actuating-element rotation is devoted to achieving the eccentric throw (without rotating the ball), whereby to displace the ball-rotation axis in the axial direction away from seat engagement; the ball surface is thus displaced into axially offset clearance with respect to the seat, before devoting the remaining fraction of actuating-element rotation to the task of rotating the ball to its valve-open position. In the presently preferred form to be described, a rotary lostmotion connection between eccentric displacement and ball rotation makes it possible for a single direction of controlled driving torque to the actuating element to perform the indicated sequence for a valve-opening direction, and the reverse sequence for a closing direction of valve actuation; in the closing direction, all rotation of the valve-member ball is in axially offset relation to the seat, while eccentric displacement to achieve a seated closure occurs only after the ball has been rotated into axially offset register with its seat.

DETAILED DESCRIPTION

A preferred embodiment of the invention will be described in detail, in conjunction with the accompanying drawings, in which:

FIG. 7 is a table to show winding excitation patterns for operation of control circuitry of FIGS. 5 and 6;

Figure 1:
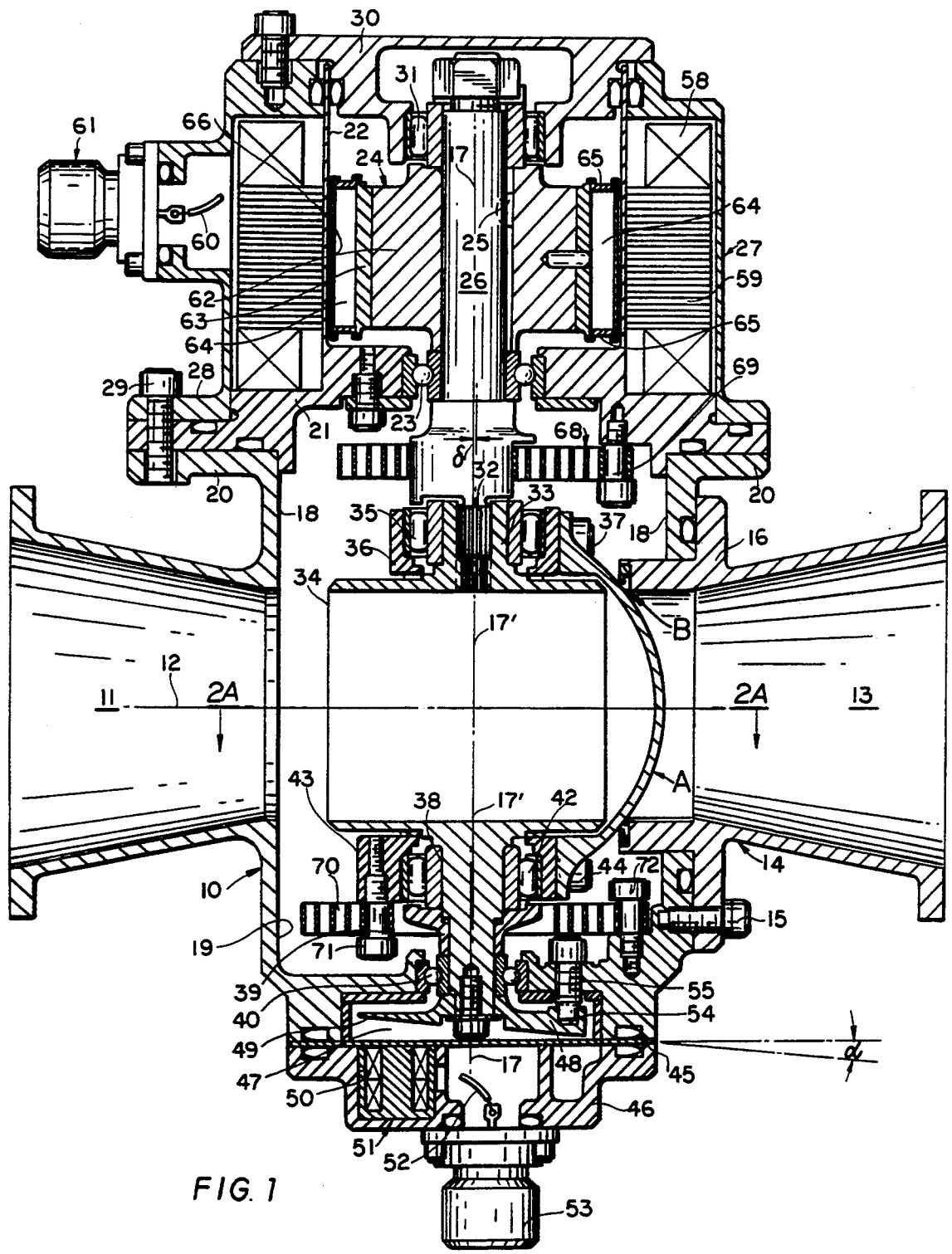
FIG. 1 is a vertical section through a rotary valve of the invention, in closed condition, and taken in the plane defined by the axis of inlet-outlet flow and by the rotary axis of valve actuation.

In FIG. 1, the invention is shown in application to a valve having a rotatable spherical valve member A in seated coaction with an annular seat B, all within a two-piece body; even though valve member A is shown as a truncated fraction of a spherical shell, it will sometimes be referred to as a ball. The principal part 10 of the valve body defines a convergent frusto-conical inlet port or passage 11 having a central axis 12 of fluid-flow alignment with an outlet port or passage 13. Outlet passage 13 has the bore diameter of the downstream or reduced end of the inlet port 11, and passage 13 is seen to be provided by the second or closure part 14 of the two-piece valve body; body part 14 mounts the annular seat B and has bolted connection 15 to body part 10 by way of a circumferential flange 16. Between the port passages 11, 13, and on an axis 17 of motor-driven rotary actuating displacement, the body part 10 is seen to include upper and lower counterbore formations 18, 19. The upper counterbore 18 terminates at a radial flange 20 which is the means of mounting the flanged base 21 of an upwardly open cylindrical skirt 22 for sealed containment of fluid which is permitted to flood the rotor assembly 24 of an electric-motor actuator for the valve.

The rotor assembly 24 is keyed at 25 to a drive shaft 26, centered on axis 17 by a lower ball bearing 23 that is fitted to the flanged motor-mounting base 21. An annular motor-housing member 27 has a base flange 28 in register with outer-flange regions of valve-body and motor-mounting parts 20, 21, and these registering regions are securely retained by bolts as at 29. The motor housing is completed by an end-closure member 30 having bolted assembly to the motor-housing member 27 and is shown fitted to a roller-bearing unit 31 for centrally stabilized retention of the upper end of drive shaft 26, on axis 17.

For a purpose that will be made clear, and lower end of shaft 26 is shown with a spliced cylindrical formation 32 centered on an axis 17' that is eccentrically offset (to the extent $\delta$) from the drive-mounting axis 17 of shaft 26. The upper hub 33 of a flow-tube member 34 has spline-driven connection to the shaft formation 32, and this same hub 33 also mounts a roller-bearing unit 35 for anti-friction support of an annular member 36, centered on the eccentrically offset axis 17'; the valve member A has bolted connection 37 to the annular member 36.

Consistent with the described rotary mounting and eccentric offsetting established for the upper support of valve member A, the flow-tube member 34 is seen to have an integrally formed lower stem with adjacent mounting surfaces 38, 39 which are respectively offset to the same eccentric extent $\delta$. Specifically, the lower mounting surface 39 is centered on the motor-driven rotary axis 17 via a ballbearing unit 40 which is fitted to the lower counterbore formation 19 of the body part 10; and a roller-bearing unit 42, fitted to the upper mounting surface 38, provides eccentric antifriction support for an annular member 43, to which valve member A has further bolted connection 44.

The otherwise-open lower end of valve-body part 10 is closed by a seal or gasket 45 and by a bottom-closure or cap member 26 which will be understood to be retained in assembly to body part 10, by peripherally spaced bolts (not shown). The thus-closed lower counterbore defines a short cylindrical space 47 for rotatable containment of a circular plate 48 which has an angularly truncated lower surface 49, truncated at an angle $\alpha$ to a radial plane about axis 17. Plate 48 is keyed and bolted to the lower end of the two-land stem 38, 39 of flow tube 34 and is of magnetic-flux conducting material, for variable-reluctance angle-tracking coaction with magnetic tracking circuitry that is contained within the closure-cap member 46.

For the angle-sensing purposes indicated, cap member 46 and the sealing gasket 45 will be understood to be of non-magnetic material such as aluminum or stainless steel, but a cylindrical bore 50 in cap member 46 is open in the direction which faces an eccentrically offset locale of the truncated lower surface 49 of plate 48. Bore 50 is fitted with a ferromagnetic core 51, which is an E-configuration of revolution about its central axis, namely, the axis of the bore 50 to which it is fitted; core 51, which may be a sintered consolidation of one or more magnetic-oxide powders, thus is characterized by a central stem concentrically positioned within an annular shell, by reason of a lower-end closure wall. Excitation and sensing windings linked to the core stem enable electrical sensing of the gap to plate 48, as a function of instantaneous angular position of plate 48 and, therefore, of rotary actuation of shaft 26 about axis 17. To this end, provision is made within cap 46 for accommodation of requisite electrical-winding leads (e.g., at 52) to a standard multiple-pin external-connector fitting 53. The described variable-reluctance device will be understood to provide sensed angular-position data in the form of electrical signals which are used to commutate motor windings as a function of rotor-angle position, as will later become clear.

To complete the description of plate 48, an upwardly open arcuate groove 54 is formed in plate 48 to receive a stop pin at the lower end of a bolt 55 which is threaded to valve-body part 10. The arcuate extent of groove 54 will be understood to be in the order of 180 degrees about axis 17, for determining limit stops for 180 degrees of shaft 26 rotation.

The electric motor shown to be contained within housing 27 is suitably a brushless D.C. motor, the stator of which comprises windings 58 and a stack 59 of laminations; electrical leads as at 60 to the windings are supplied via a standard multiple-pin external-connection fitting 61. The stator components are sealed inside the annular space defined by and between housing member 27 and the flanged base member 21 and its skirt 22, the sealed containment foreclosing stator components from exposure to effluent-gas and ambient environments. The rotor 24, including shaft 17, consists of a core 62, back-up iron 63 and permanent magnets 64, retained by annular end pieces 65 which, with an outer cylindrical cladding or shell 66, complete the sealed containment and protection of the magnets 64 from effluent-gas exposure. The thus-sealed stator and rotor assemblies provide a so-called "wetted construction", allowing effluent to enter and pressurize the rotor cavity of the motor. And since it is not necessary to seal the motor drive shaft 26, no dynamic seals need be used at any of the sites of rotary-bearing support.

For fail-safe purposes, a wound and tensed first clock spring 68 is secured at its inner end to shaft 26, with outer-end anchorage by bolt 69 to the flanged-base member 21. For a similar purpose, as well as to angularly bias a lost-motion connection to be described, a second clock spring 70 is secured at its inner end by bolt connection 71 to annular mount 43 for valve member A, while the outer end of spring 70 is anchored by a bolt connection 72 to body part 10. The direction of torsional bias by the first spring 68 assures preload of shaft 26 in the angular direction of its limit stop via bolt 55, corresponding to the closed position of valve member A. Similarly, the direction of torsional bias by the second spring 70 assures preload of valve member A in the angular direction of a limit stop (not shown in FIG. 1) corresponding to the closed position of valve member A.

Figure 2A:
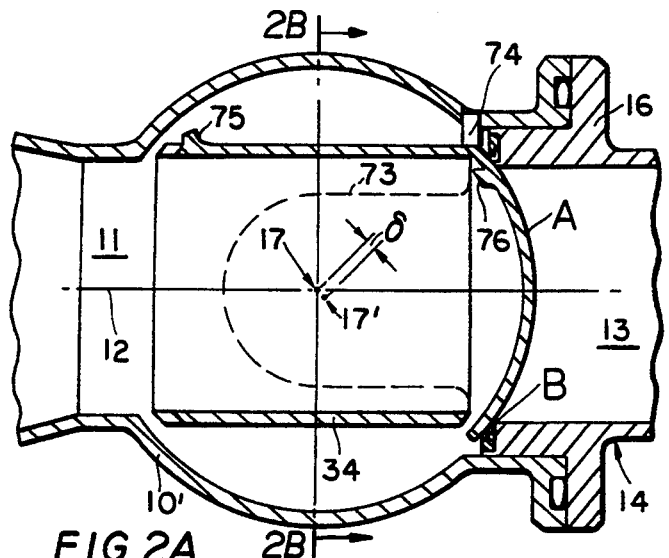
FIG. 2A is a fragmentary sectional view taken at 2A—2A in FIG. 1, to illustrate the closed and seated condition of the valve.
Figure 2B:
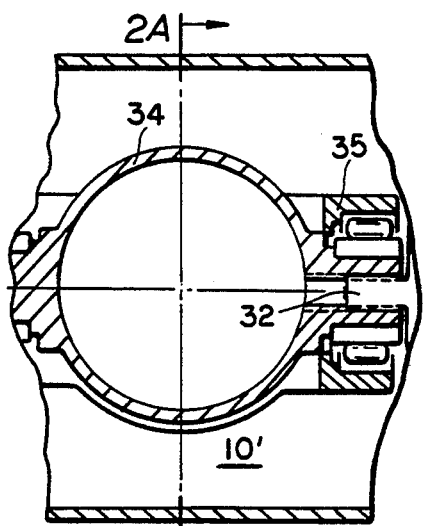
FIG. 2B is a fragmentary sectional view taken at 2B—2B of FIG. 2A, in further illustration of the closed condition of the valve, with the plane of FIG. 2A being indicated in FIG. 2B.
Figure 3A:
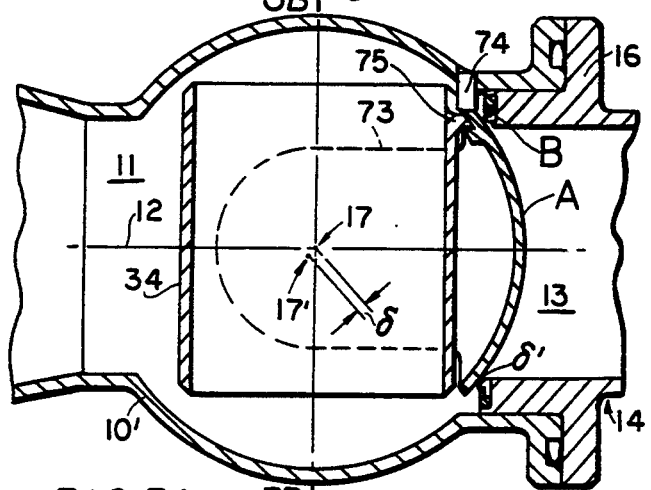
FIG. 3A is a view similar to and taken in the same plane as FIG. 2A, to illustrate an intermediate position wherein the valve member has been axially "lifted" away from its seated condition.
Figure 3B:
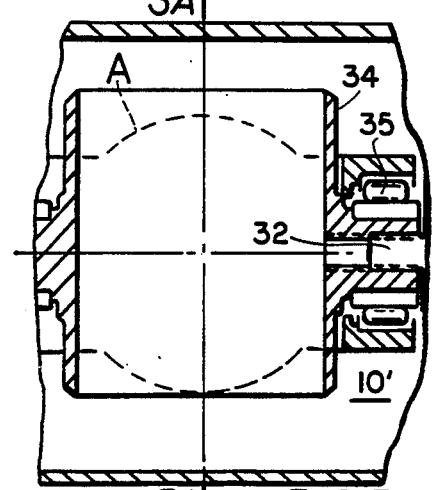
FIG. 3B is a view similar to FIG. 2A, but taken in the plane 3B—3B of FIG. 3A, in further illustration of said intermediate position.
Figure 4A:
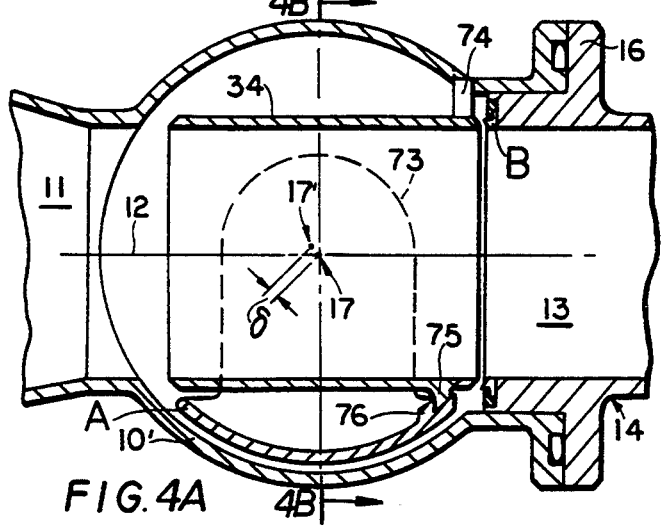
FIG. 4A is a view similar to and taken in the same plane as FIGS. 2A and 3A, to illustrate the full-open condition of the valve.
Figure 4B:
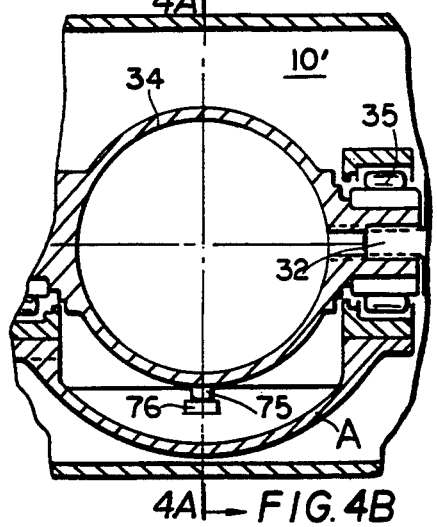
FIG. 4B is a view similar to FIGS. 2B and 3B, but taken in the plane 4B—4B of FIG. 4A, in further illustration of the full-open condition of the valve.

The latter limit-stop function will be better understood from a description, in connection with FIGS. 2 to 4, for representative angular positions and displacements of shaft 26 (and the flow tube 34 which it mounts), in relation to concurrent angular positions and displacements of valve member A, by reason of their spring-biased lost-motion connection. It must initially be explained that, for purposes of simplified identification of parts in FIG. 1, certain internal structural formations of valve body 10 have been omitted, and that for similar reasons in the diagrams of FIGS. 2 to 4, a simplified showing of internal valve-body (10) features has been adopted and given the reference numeral 10' to avoid confusion; thus in FIGS. 2 to 4, the numeral 10' is to be taken as signifying a structurally fixed part of or attachment to the primary valve-body part 10.

Referring now to FIGS. 2A and 2B, which show the closed condition of the valve of FIG. 1, the valve member A is seen to be circumferentially continuously engaged to seat B, with the central axis of flow tube 34 aligned with the axis 23 of inlet and outlet passages 11, 13. Dashed lines 73 identify one of two spaced yoke arms, defined by the bolted annular members (36, 43) which thus form parts of valve member A and which therefore support valve member A for angular displacement about the eccentric axis 17'. As previously explained, axis 17' is eccentrically offset from the motor-driven shaft axis 17 to the extent δ, and in FIG. 2A it is indicated that, for the valve-closed condition shown, the direction of eccentric offset places axis 17' in what may be termed the 4:30 o'clock position with respect to the motordriven shaft axis, for the sense depicted in FIG. 2A. At all times, the directional preload torque of spring 70 will be understood to be operative in the counterclockwise direction of valve-member abutment with a stop 74 fixed to the valve body.

In the drawing of FIG. 2A, stop 74 is out of the plane of the section and is therefore not cross-hatched; this is so that a driven clockwise rotation of motor shaft 26 about axis 17 will permit an integrally formed outward lug portion 75 of flow tube 34 to avoid interference with stop 74 and to engage a local inward lug formation 76 of valve member A. FIG. 3A depicts this instant, following a first 90 degrees of shaft 26 (and flow tube) rotation, during the course of which shaft 26 has angularly displaced the eccentric axis 17' from the 4:30 o'clock direction of offset δ (per FIG. 2A) to the 7:30 o'clock direction of offset δ (per FIG. 3A), thus axially withdrawing valve member A a distance of about 1.4 times the value δ of the eccentric offset. Such withdrawal assures purely axial relieving displacement of valve member A from its FIG. 1 position of seat engagement, leaving the clearance δ' which can be seen in FIG. 3A; and this purely axial displacement is assured by reason of spring (70) action, holding valve member A against stop 74.

The described initial 90° of driven shaft rotation will be recognized as the "lost" half of the lost-motion connection between shaft 26 and valve member A. Once the flow-tube lug 75 engages the lug 76 of valve member A, the further driven rotation of shaft 26 effects displacement of both the flow tube 34 and valve member A, to the limiting position shown in FIG. 4A, wherein the valve is fully open, with flow tube 34 aligned on the flow axis of ports 11, 13. In this condition, the eccentric axis 17' will have been displaced another 90°, resulting in a 10:30 o'clock offset direction for axis 17' with respect to the drive axis 17. And since valve member A was fully cleared from seat engagement at the half-way point of shaft-26 rotation, the succeeding half of the 180° course of shaft-26 rotation is free of torsional friction attributable to seat B.

The cycle of valve-closing events will be seen to be as described for the valve-opening sequence, except in reverse order. Specifically, starting with the full-open condition of FIGS. 4A and 4B, return torque acting on drive shaft 26, whether motor-driven in the reverse, counterclockwise direction, or driven by the fail-safe counterclockwise action of spring (68) bias, will account for the first 90° of rotary return (FIG. 4A to FIGS. 3A) while the counterclockwise spring (70) bias of valve member A keeps the lugs 75, 76 in constant engagement. At the FIG. 3A or mid-point position, however, valve member A encounters the fixed stop 74, thus foreclosing further rotation of valve member A. Continued retracting rotation of shaft 26 (flow tube 34), from the FIG. 3A relation to the FIG. 2A relation, is totally without action on valve member A, other than to axially displace the eccentric axis 17' and therefore also the valve member A. Finally, at the end of the 180° displacement range of shaft 26, valve member A achieves its circumferentially continuous engagement to seat B, and the valve is fully closed again.

As noted above, the drive motor for shaft 26 is preferably a brushless D.C. servo motor, brushless being indicated to avoid reliance upon mechanical brushes sliding on a commutator; instead, multiple windings in the stator are commutated by semiconductor power switches. Suitable brushless motors of the character indicated are commercially available from a plurality of sources, including Sierracin/Magnedyne, of Carlsbad, Calif., and Magnetic Technology Division of Vernitron Corporation, Canoga Park, Calif., so that extensive description is unnecessary for present purposes. Suffice it to say that the motor in FIG. 1 preferably employs three winding phases, in a 12-pole configuration.

Figure 5:
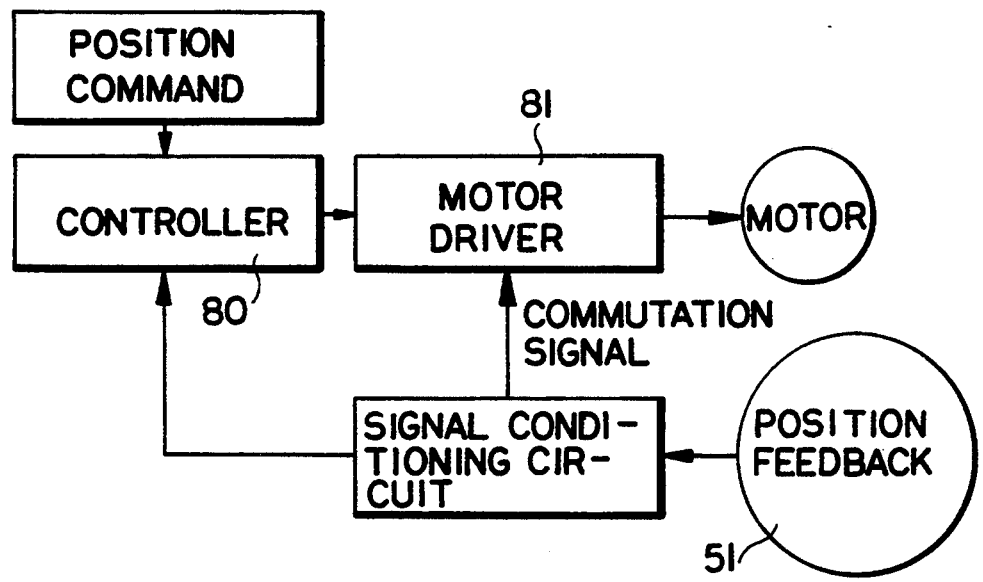
FIG. 5 is an electrical block diagram of drive circuitry for the valve of FIG. 1.
Figure 6:
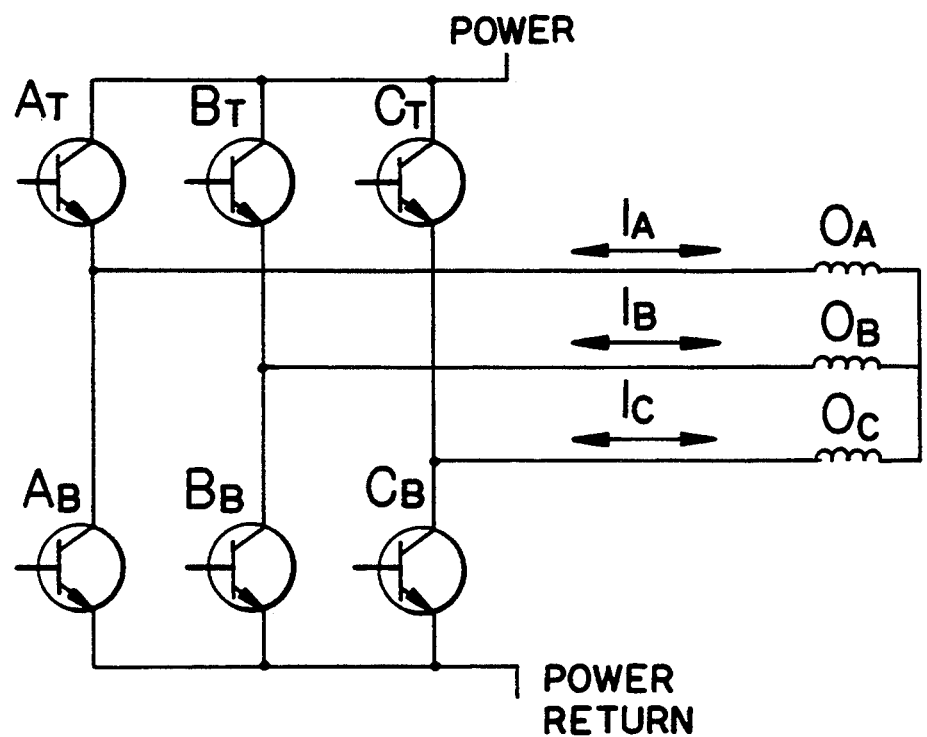
FIG. 6 is a more-detailed electrical diagram, for part of the control circuitry of FIG. 5.

Specifically, and with reference to FIG. 5, for any valve-member command position, the output of the position sensor 51 is used by an electronic controller 80 to establish which two of three winding phases are energized at any given rotor position, using a pulse-width modulating driver circuit 81. As shown in the schematic diagram of FIG. 6, the windings ($\phi_A$, $\phi_B$, $\phi_C$) are energized by the controlled "ON" or "OFF" status of three semi-conductor "totem-pole" drivers, affording one polarity of particular winding excitation by way of operating a selected one or more of semi-conductors $A_T$, $B_T$, $C_T$, and an opposite polarity of particular winding excitation by way of operating a selected one or more of semi-conductors $A_B$, $B_B$, $C_B$. The two windings energized at any given time are selected in sequence as a function of rotor position, as shown in the motor-drive tabulation and diagram of FIG. 7, for the presently described 180° course of shaft 26 rotation.

Pulse-width modulation (PM) at 81 controls motor power in proportion to the instantaneous error signal, noted at controller 80, thus providing proportional control whereby speed of the motor is proportional to the angular distance to a newly commanded valve position. As the valve approaches the commanded position, the PM duty cycle is reduced, to lower the motor current, and the motor progressively slows down as the motor torque balances opposing return-spring torque and torques attributable to fluid-flow forces.

Figure 8:
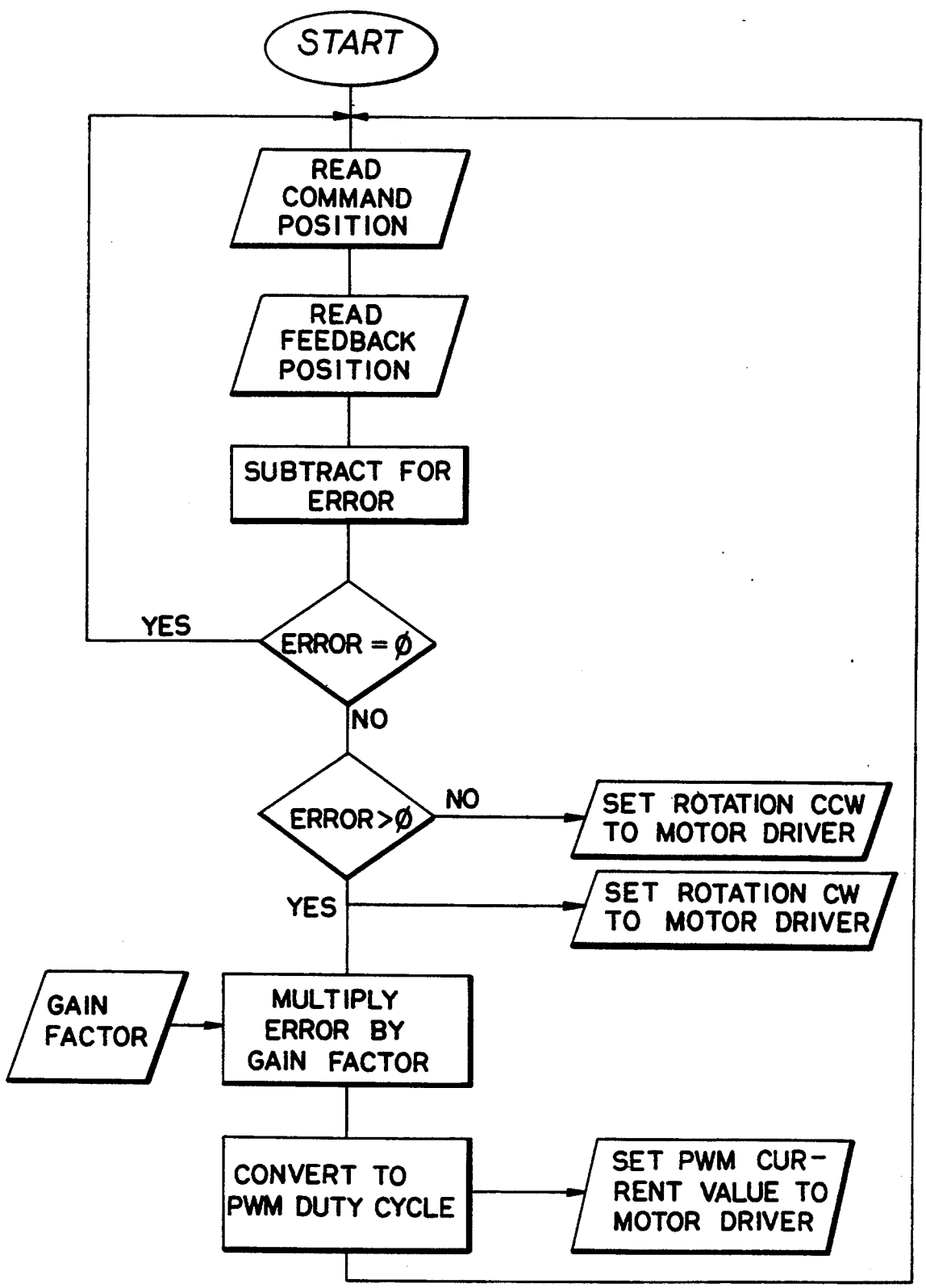
FIG. 8 is a flow diagram for microprocessor control of the circuitry of FIG. 5.

A microprocessor system repetitively operates a control loop (see flow chart of FIG. 8) in the same sequence, using an update rate many times faster than the valve response. The rate of change of motor power with error is called the gain factor. For fast response, the proportional gain will be set fairly high, causing the motor to operate at 100% duty cycle (full power) until it approaches the desired position. Power then reduces rapidly and the valve comes to rest. The selected amount of gain involves a balance: if the gain is too great, the valve will be unstable; if the gain is too low, valve action will be sluggish. Gain value can be roughly predicted, but it is desirably left variable and is fine tuned in testing.

Once the valve reaches the commanded position, it remains at rest, but the control loop continuously updates, repetitively reading the commanded and the feedback positions and adjusting the energizing PM duty cycle and/or polarity to the motor windings, should a change be required.

It will be seen that the described ball-valve construction meets all stated objects, most importantly by eliminating all sliding-seal action, and there are no ambient vents, these being the two primary sources of problems, such as leakage, sticking and freezing, in cryogenic valves. Superior valve-position control results from the eccentric lifting of valve member A from seat B before any rotation of valve member A to open condition, thus avoiding any rub against seat B and enabling frictionless operation; as a result, it is possible to provide precise and stable electronic closed-loop positioning control of valve member A rotation, over a very wide turn-down ratio. There are no contacting mechanical switches, and motor brushes are not used. And, of particular importance in the handling of cryogenic oxygen or hydrogen flows, all electronic devices are positively isolated from the effluents of such gases.

It will be appreciated that in the description of FIG. 1, reference to mechanical seals has been omitted, for purposes of simplified description. Nevertheless, it is to be noted that elastomeric or plastic seals are shown throughout in FIG. 1, for sealed completion of the fit between the several described component parts of valve body structure, as well as the motor-housing and positiontransducer housing components fixed to and thereby integrated into the total body structure. Each sealing ring is shown located in its retaining groove and in squeezed compression against the surfaces thereby sealed.

The angular lost-motion connection and eccentric drive which have been described for providing the valve lift-off feature of the invention will be seen to be favored by reliance upon an eccentric offset $\delta$ which is small compared to the spherical radius of valve member A. By keeping this offset relation very small, one minimizes the extent to which the valve is opened during the opening half (FIG. 2A to FIG. 3A) phase of the opening cycle. For example, for a valve of FIG. 1 having a 1.20-in. diameter valve-closing seat B, an eccentric offset $\delta$ of 0.02 inch will suffice, particularly when one considers that, for the described total eccentric displacement of what amounts to $\pi$ radians, wherein the limits of eccentric-offset orientation are on what may be called the 4:30/10:30 axis of FIGS. 2A and the total opening displacement (FIG. 2A to FIG. 3A) accounts for only a 0.1 square-inch area available for fluid flow, involving an axial lift-off displacement of 0.03 inch; this is to be compared with the vastly greater rate of valveopening area to achieve the full 2.72 square-inch area, during the course of valve member A rotation to full-open condition (FIG. 3A to FIG. 4A). The indicated 4:30/10:30 axis of preferred eccentric-offset orientation for limits of $\pi$-radian rotation can be stated as a substantially $\pi$-4-radian inclination of geometric alignment, through the axis 17 of shaft 26 rotation and with respect to the central axis 12 of fluid flow, wherein said inclination is taken in the geometric plane which (a) includes the flow axis 12 and (b) is normal to the shaft-rotation axis 17.

Figure 9:
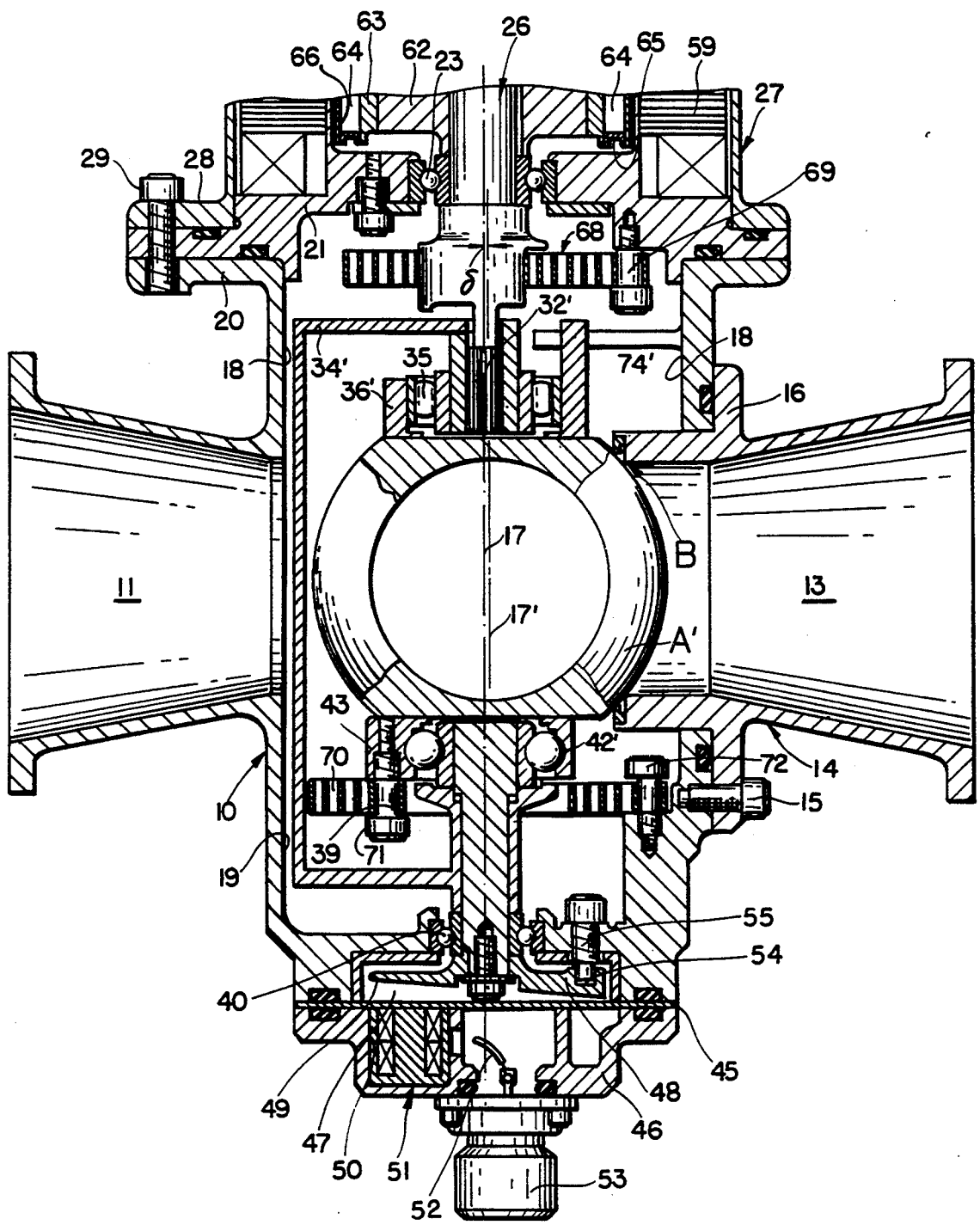
FIG. 9 is a fragmentary vertical section, otherwise generally similar to FIG. 1 but showing a modification.

In describing valve member A as a relatively thin-shell truncation from a geometric sphere, it is to be understood that this is a preferred form, which has the merit of minimum weight and which minimizes inertial effects that could otherwise reduce the time-constant of response to commands for angular change of valve-member position. For example, the more solid ball of a conventional ball valve can embody the "lift-off" concept of the invention as long as an angular lost-motion relation is provided between the ball and its drive shaft, with the ball mounted for its rotation about an axis that is eccentrically offset to the extent $\delta$ from the drive-shaft axis of rotation. FIG. 9 illustrates such a situation, wherein a solid-ball valve member A' is in valve-closed position, closing off fluid flow by reason of ball member A' having been eccentrically displaced into continuous contact with seat B; ball member A' has a central bore which is seen in FIG. 9 to be 90° away from its alignment with the axis of seat B, when in open condition.

Ball member A' is mounted for eccentric displacement by the same upper and lower bearing supports, at 35 and 42, as already described, except that the lower bearing 42' is shown as a ball bearing, for gravitational-support purposes. The upper and lower eccentric throws ($\delta$) are coordinated by a side-arm connection 34', functionally corresponding to the flow-tube connection 34 of FIG. 1. Torsional springs 68, 70 provide the previously described biasing torques, with the valve-closed condition being held by spring 70 urging ball member A' to its stop engagement with body stop 74'.

As described for FIGS. 2A, 2B to 4A, 4B, the first 90° of valve-opening events accomplishes the axial retraction of ball member A' from seat B rotationally displacing arm 34', but without rotating the ball member. Beyond this point, abutment features of arm 34' and ball member A' engage to drive valve member A' 90° into axial alignment of its bore with the inlet and outlet passages 11, 13. Valve-closure events follow the reverse sequential order, and are driven by the respective spring actions at 68, 70.

Figure 10:
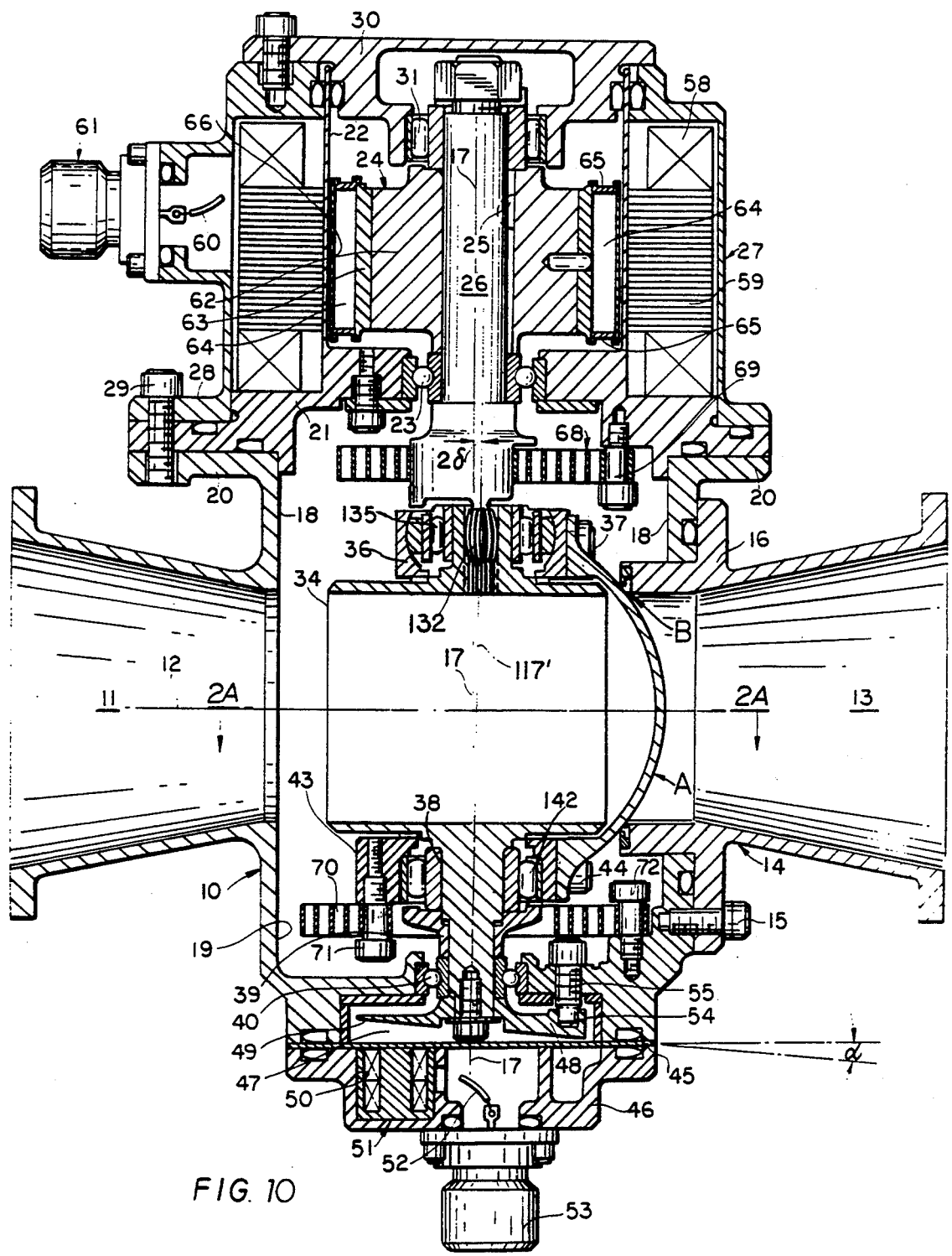
FIG. 10 is a vertical section along the lines of FIG. 1 to show a different modification.

FIG. 10 illustrates a modification of the valve construction of FIG. 1, in that the eccentric displacement discussed in connection with FIG. 1 is, in FIG. 10, limited to one side to the exclusion of the other side of the central axis 12 of flow. Thus, in FIG. 10, the upper bearing 35 at which eccentric displacement occurs is the single and only point of eccentric displacement, and the lower bearing at 42 is devoid of eccentric displacement. The net result is that driven eccentric displacement at the upper bearing location, in the context of non-eccentric lower-bearing rotation, is to cause the eccentrically driven axis 117' of valve-member A to gyrate on a conical path. This conical path has its apex on the axis 17 of shaft-26 rotation; and since the upper and lower bearing locations are at substantially equal offsets, respectively above and below the central axis 12, an eccentric displacement 26 must be provided via the upper bearing, in order to achieve the same eccentric displacement δ of the geometric center of valve member as was the case for FIG. 1. In FIG. 10, the spliced member 132 via which eccentric displacement is imparted to flow tube 34 and to valve member A is shown with exaggeration to have bowed contour to accommodate varying aspects of the eccentricity, in the course of $\pi$ radians of motor drive.

Figure 11:
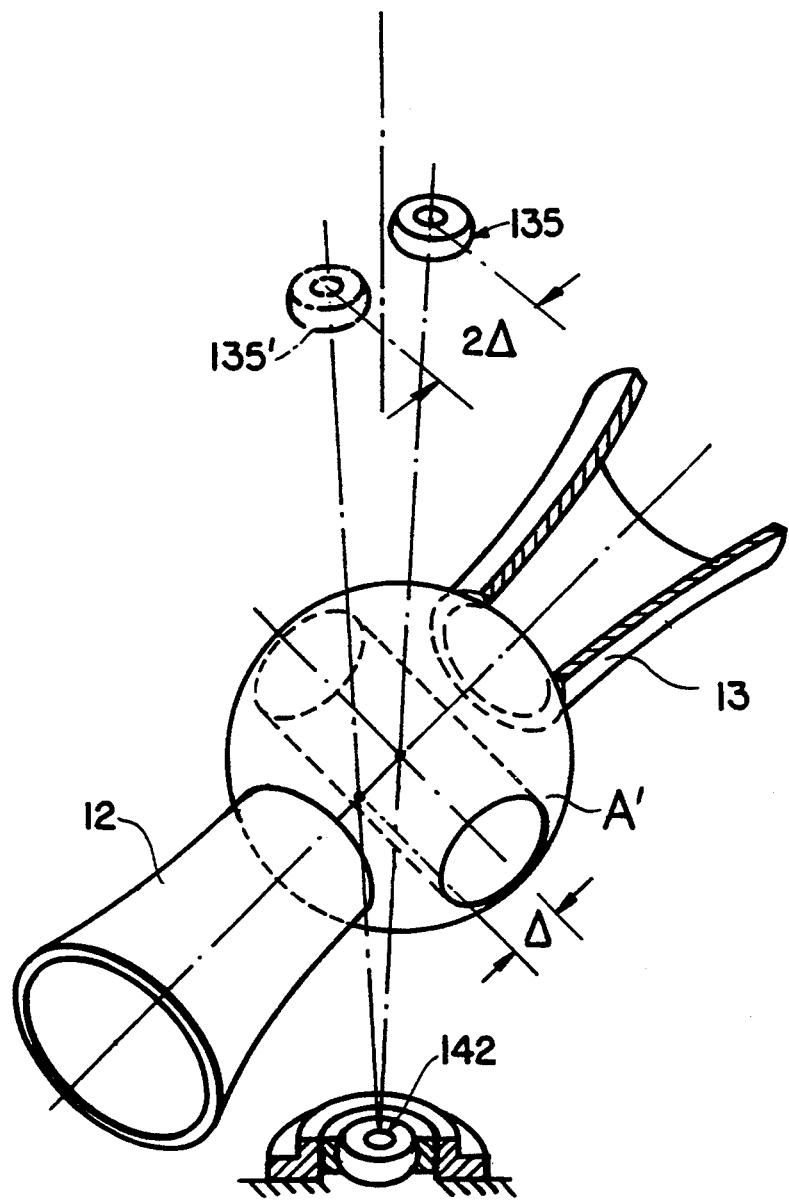
FIG. 11 is a schematic and somewhat isometric diagram to illustrate a principle of operation in the modification of FIG. 10.

FIG. 11 schematically illustrates the principle involved in the one-side only eccentricity arrangement of FIG. 10, except that in FIG. 11, the eccentric throw Δ has been greatly exaggerated for emphasis. In FIG. 11, selfaligning bearing means 135 is again the instrumentality by which eccentrically driven displacement is imparted to the axis of rotation of the valve member A', the magnitude (2Δ) of eccentric throw being apparent from the full-line showing (135) and the phantom-line showing (135') of the upper bearing. And because the resulting gyration is necessarily relatively great in FIG. 11, another self-aligning bearing is shown at 142 for rotationally free mounting of the gyrated axis at the apex of conical displacement.

As a practical matter however, for valves of the present character where desired eccentric displacement of the geometric center of valve-member displacement is small compared to the space between involved upper and lower bearings, there may be sufficient angular "play" in commercial radial ball-bearings to accommodate the angular offset between the shaft axis (first rotary axis) and tile eccentrically gyrated second rotary axis, namely, the axis of valve-member rotation, whereby it may not be necessary to make special provision for self-aligning accommodation of the eccentric gyration. In other words, if the eccentrically driven upper-bearing throw 28 is small enough compared to the vertical distance between the upper and lower bearings (135, 142), the apparatus shown in FIG. 1 will serve the conical gyration mode as long as the lower bearing provides the apex of conical gyration, on the axis of the motor-driven shaft 26.

What is claimed is:

1. A rotary valve, comprising a valve body with inlet and outlet ports and a rotatable valve member for determining fluid flow from the inlet port to the outlet port, one of said ports having an annular seat about and normal to a central axis of fluid flow, said valve member having a truncated convex spherical outer surface of greater radius than the radius of said annular seat, a drive shaft journalled in said body for rotation about a first rotary axis through and transverse to said central axis, selectively operable means for driving said shaft within angular limits spaced approximately $\pi$ radians apart, eccentric means on said shaft on one side of said central axis to the exclusion of the other side of said central axis, said eccentric means mounting said valve member on a second rotary axis for eccentric gyration in a conical orbit that is incrementally inclined in angular offset from said first rotary axis, the mounting of said valve member on said second rotary axis being on a diameter of the geometric sphere of the outer surface of said valve member, whereby a full drive of said shaft between said limits will impart. approximately $\pi$ radians of eccentrically gyrated displacement to said second rotary axis, and angular lost-motion means connecting said shaft in a first phase to impart rotation to said valve member for substantially only $\pi/2$ radians from one of said limits and in a second phase of substantially only the remaining $\pi/2$ radians to impart rio rotation to said valve member.

2. The rotary valve of claim 1, wherein said outlet port is the port having the annular seat, whereby fluid pressure at the inlet port is operative in the closed position of the valve to load the valve member in the direction of seat engagement.

3. The rotary valve of claim 1, wherein said valve member is an angularly truncated spherical shell.

4. The rotary valve of claim 3, wherein said shell is a first component part of said valve member, and wherein a second component part is a tubular element having a cylindrical bore of diameter substantially matching the inner diameter of said seat, said tubular element being mounted to said shaft for rotary displacement therewith, said tubular element being aligned with the central axis of fluid flow at both said limits of shaft rotation.

5. The rotary valve of claim 1, wherein said shell is a first component part of said valve member, and wherein a second component part is a tubular element having a cylindrical bore of diameter substantially matching the inner diameter of said seat, said tubular member being aligned with the central axis of fluid flow at the valve-open limit of shaft rotation, and wherein stop means coacting between a part of said valve body and a part of said valve member is oriented to arrest valve-member rotation at a position of axial register with but offset from said seat, said position determining an intermediate rotary shaft position at which the lost-motion connection transfers from one to the other of its phases of imparting and not imparting rotation of said valve member.

6. The rotary valve of claim 5, in which said tubular element and said shell have coacting abutments operative to engage at said intermediate rotary shaft position for one direction of transfer from one to the other of said phases and to disengage at said intermediate rotary shaft position for the direction of transfer from said other to said one of said phases.

7. The rotary valve of claim 6, in which torsionally compliant spring means reacting between said body and said valve member loads said valve member in the direction of axial register with said seat.

8. The rotary valve of claim 1, in which torsionally compliant spring means loads said drive shaft in the valveseating direction of eccentric throw.

9. The rotary valve of claim 1, in which the respective directions of the eccentric offset at said angular limits are on a single diametrical alignment through the shaft axis, said diametrical alignment being in a geometric plane that includes the central axis of fluid flow and is normal to the shaft-rotation axis, said diametrical alignment being at an acute angle of substantially $\pi/4$ radians of inclination from said central axis, whereby in one of said phases of shaft rotation eccentric displacement of said valve member is essentially in the direction of said central axis of fluid flow, and whereby in the other of said phases of shaft rotation eccentric displacement of said valve member is essentially transverse to the direction of said central axis of fluid flow.

10. The rotary valve of claim 1, in which actuating means for said valve comprises a limited-displacement electric motor mounted to said body and connected to drive said lost-motion connection.

11. The rotary valve of claim 10, in which said motor is a brushless D.C. motor.

12. The rotary valve of claim 11, in which said motor comprises an armature keyed to said drive shaft and supported by antifriction bearings having no seals, said armature being clad with non-magnetic protective material for corrosion-free exposure to fluid effluent within said body.

13. The rotary valve of claim 11, wherein said motor has twelve poles and includes a stator with three phase windings.

14. The rotary valve of claim 10, wherein said shaft comprises upper and lower portions one of which is directly driven by said motor and the other of which mounts shaft-position sensing means producing an electrical output signal which is a function of instantaneously sensed angular position of said shaft about its axis of rotation.

15. The rotary valve of claim 14, in which control means for said motor includes a feedback connection to the said signal output of said shaft-position sensing means.

16. The rotary valve of claim 14, in which said shaft-position sensing means is a variable reluctance device having a magnetic circuit comprising coacting core elements on said shaft and on said valve body, coacting core elements on said shaft and valve body being spaced to define a gap which varies as a function of shaft-angle position.

17. A rotary valve, comprising a valve body with inlet and outlet ports and a rotatable ball-valve member for determining fluid flow from the inlet port to the outlet port, one of said ports having an annular seat about and normal to a central axis of fluid flow, said valve member having a truncated convex spherical outer surface of greater radius than the radius of said annular seat, whereby to permit fluid flow when the truncation traverses said seat and to arrest fluid flow when said spherical surface fully covers said seat, a drive shaft journalled in said body for rotation about a first rotary axis through and transverse to said central axis, selectively operable means for driving said shaft within angular limits spaced approximately $\pi$ radians apart, eccentric means on said shaft on one side of said central axis to the exclusion of the other side of said central axis, said eccentric means mounting said valve on a second rotary axis for eccentric gyration in a conical orbit that is incrementally inclined in angular offset from said first rotary axis, the mounting of said valve member on said second rotary axis being on a diameter of the geometric sphere of the outer surface of said valve member, whereby a full drive of said shaft between said limits will impart approximately $\pi$ radians of eccentrically gyrated displacement to said second rotary axis, and angular lost-motion means connecting said shaft in a first phase to impart rotation to said valve member for substantially only $\pi/2$ radians from one of said limits and in a second phase of substantially only the remaining $\pi/2$ radians to impart no rotation to said valve member.

18. The rotary valve of claim 17, in which said ball-valve member is a spherical solid having a diametrically extending cylindrical bore of diameter substantially matching the inner diameter of said seat, said bore at intercept with said spherical surface providing essentially the only truncation of said spherical outer surface.

19. The rotary valve of claim 17, wherein said valve member is an angularly truncated spherical shell.

20. The rotary valve of claim 17, wherein said eccentric means includes a self-aligning bearing connection in the mounting of said valve member on said second rotary axis.

21. The rotary valve of claim 20, in which said valve member on the other side of said central axis is mounted to said first rotary axis via a self-aligning bearing connection.

* * * * *